United States Patent
Flucht et al.

(10) Patent No.: US 9,016,791 B2
(45) Date of Patent: Apr. 28, 2015

(54) FIXING DEVICE FOR A VEHICLE SEAT AND VEHICLE SEAT

(75) Inventors: Stefan Flucht, Solingen (DE); Ian George, Shropshire (GB)

(73) Assignee: Johnson Controls GmbH, Burscheid (DE)

( * ) Notice: Subject to any disclaimer, the term of this patent is extended or adjusted under 35 U.S.C. 154(b) by 89 days.

(21) Appl. No.: 13/813,841

(22) PCT Filed: Aug. 4, 2011

(86) PCT No.: PCT/EP2011/063475
§ 371 (c)(1),
(2), (4) Date: Apr. 4, 2013

(87) PCT Pub. No.: WO2012/017049
PCT Pub. Date: Feb. 9, 2012

(65) Prior Publication Data
US 2013/0214581 A1    Aug. 22, 2013

(30) Foreign Application Priority Data
Aug. 4, 2010   (DE) .......................... 10 2010 033 267

(51) Int. Cl.
  B60N 2/02    (2006.01)
  B60N 2/20    (2006.01)
  B60N 2/30    (2006.01)

(52) U.S. Cl.
  CPC ...... *B60N 2/20* (2013.01); *B60N 2/206* (2013.01); *B60N 2/3011* (2013.01); *B60N 2/3065* (2013.01); *B60N 2/309* (2013.01); *B60N 2/02* (2013.01)

(58) Field of Classification Search
  USPC ................... 297/341, 378.1, 378.14, 378.12
  See application file for complete search history.

(56) References Cited

U.S. PATENT DOCUMENTS

| | | | | |
|---|---|---|---|---|
| 4,805,953 | A * | 2/1989 | Yamauchi | 297/378.1 |
| 5,269,588 | A * | 12/1993 | Kunz et al. | 297/378.1 |
| 6,293,603 | B1 * | 9/2001 | Waku et al. | 297/341 |
| 6,827,404 | B2 * | 12/2004 | Blair et al. | 297/378.12 |
| 7,014,263 | B2 * | 3/2006 | Mukoujima et al. | 297/341 |
| 7,252,337 | B2 * | 8/2007 | Hofmann et al. | 297/378.14 |
| 7,255,384 | B2 | 8/2007 | Saberan et al. | |
| 7,367,624 | B2 * | 5/2008 | Garland | 297/378.1 |

(Continued)

FOREIGN PATENT DOCUMENTS

| | | |
|---|---|---|
| DE | 103 55 819 A1 | 6/2005 |
| DE | 102008023 526 A1 | 1/2009 |

(Continued)

OTHER PUBLICATIONS

Office Action received in Japanese Application No. 2013-522256 dated Mar. 25, 2014. (with translation).

(Continued)

*Primary Examiner* — Jose V Chen
(74) *Attorney, Agent, or Firm* — Foley & Lardner LLP

(57) ABSTRACT

A fixing device for a vehicle seat, especially for a motor vehicle seat, includes a multi-articulated mechanism and a locking device that unlocks the multiarticulated mechanism when the vehicle seat is pivoted or folded back past a defined limiting angle, enabling the vehicle seat to be guided, especially pivoted and longitudinally moved, in a controlled manner, between an unlocked first position and an unlocked second position or vice versa.

13 Claims, 2 Drawing Sheets

(56) References Cited

U.S. PATENT DOCUMENTS

Figure 1:
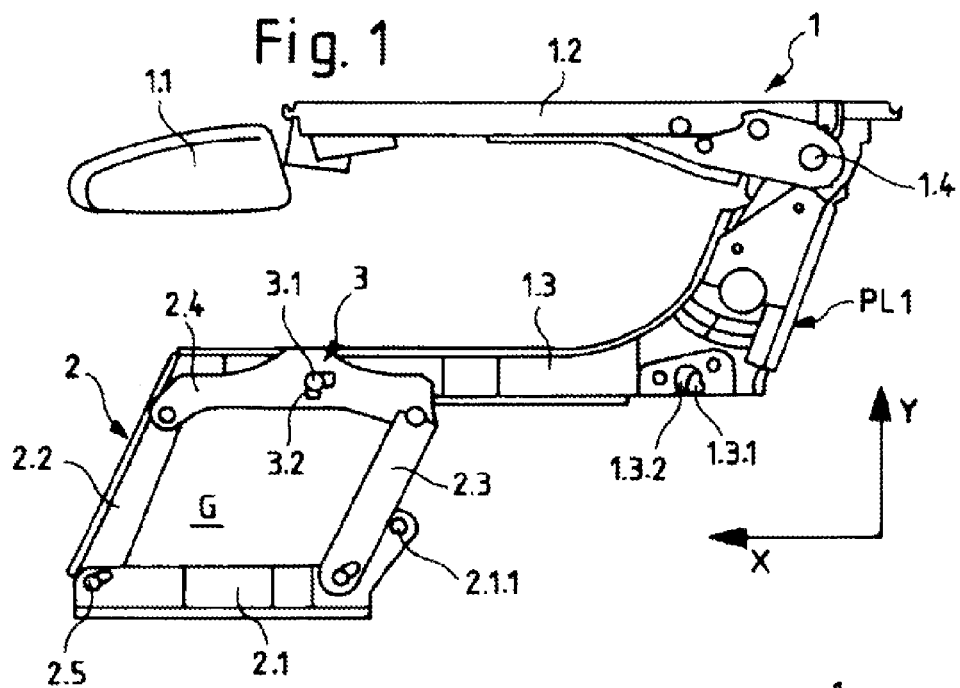

| | | | | |
|---|---|---|---|---|
| 7,434,883 | B2* | 10/2008 | Deptolla | 297/341 |
| 7,703,851 | B2* | 4/2010 | Nakaya et al. | 297/378.1 |
| 7,871,127 | B2* | 1/2011 | Bruck et al. | 297/378.1 |
| 7,967,386 | B2* | 6/2011 | Na | 297/378.1 |
| 8,197,001 | B2* | 6/2012 | Grable et al. | 297/378.1 |
| 2005/0110323 | A1 | 5/2005 | Hofmann et al. | |

FOREIGN PATENT DOCUMENTS

| | | |
|---|---|---|
| EP | 1 602 525 A1 | 12/2005 |
| JP | 06-022062 U | 3/1994 |
| JP | 11-227506 A | 8/1999 |
| JP | 2005-153874 | 6/2005 |

OTHER PUBLICATIONS

Search Report received in connection with international application No. PCT/EP2011/063475; dtd Nov. 4, 2011.

Office Action dated Oct. 10, 2014, in corresponding Chinese Application No. 201180038167.1, 8 pages.

Office Action dated Jan. 6, 2015 in corresponding Japanese Application No. 2013-522256, 4 pages.

* cited by examiner

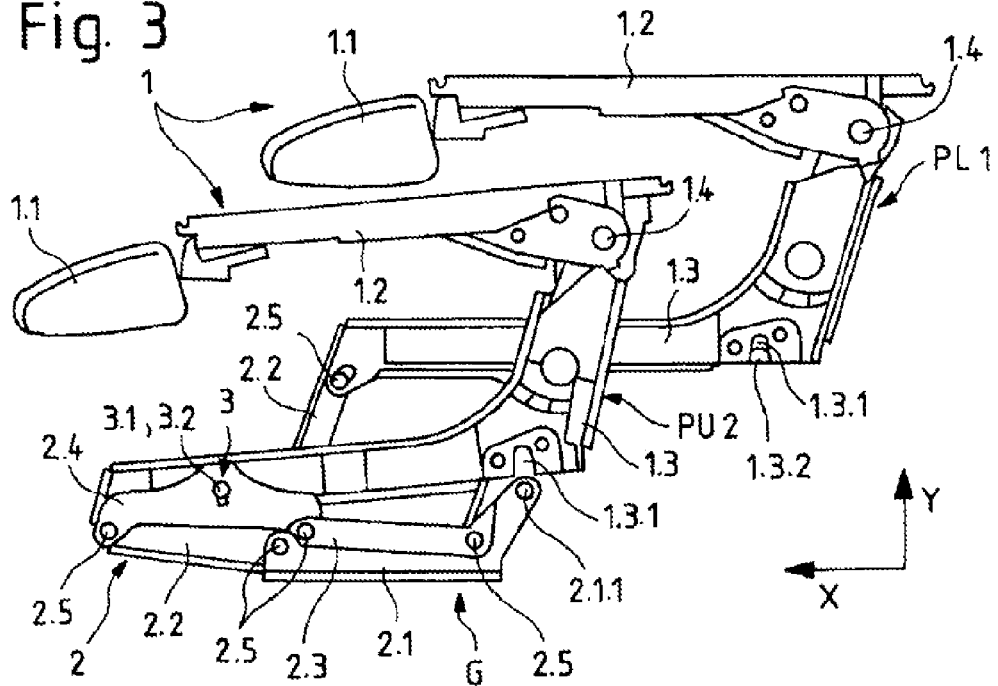
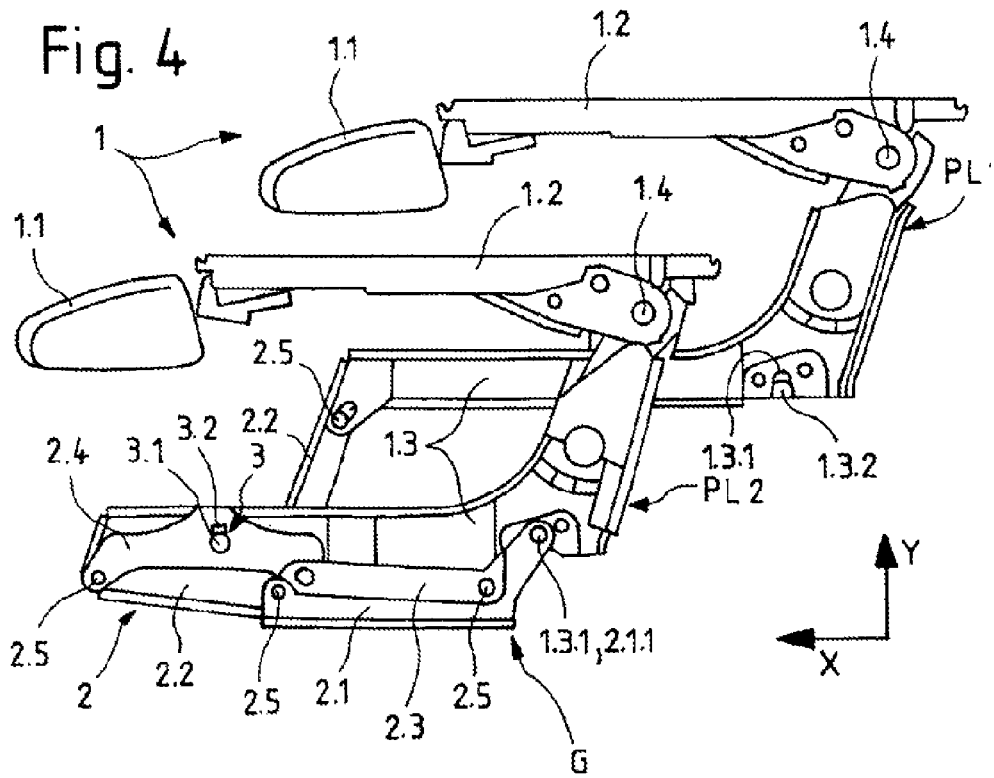

FIXING DEVICE FOR A VEHICLE SEAT AND VEHICLE SEAT

CROSS REFERENCE TO RELATED APPLICATIONS

The present application is a National Stage of International Application No. PCT /EP2011/063475 filed on Aug. 4, 2011, which claims the benefit of German Patent Application No. 10 2010 033 267.4 filed on Aug. 4, 2010, the entire disclosures of which are incorporated herein by reference.

The invention relates to a fixing device for a vehicle seat and to a vehicle seat which includes a fixing device of this type.

It is generally known from the prior art that to create an enlarged stowing space in a vehicle, vehicle seats arranged in the vehicle are displaceable and/or are foldable about one or several axes fixed to the bodywork such that the collapsed vehicle seat is able to be stowed in a footwell of the vehicle. Fixing devices, by means of which the vehicle seat is fixed in the vehicle and is foldable, are provided for this purpose.

Such vehicle seats are known, for example, from DE 103 55 819 A1, DE 10 2008 023 526 A1 or U.S. Pat. No. 7,255,384 B2.

It is the object of the present invention to provide a fixing device for a vehicle seat which is improved in relation to the prior art and simplifies stowing a vehicle seat in a footwell of the vehicle, and a vehicle seat which includes a fixing device of this type.

The object is achieved as claimed in the invention by a fixing device for a vehicle seat, the fixing device including a multi-articulated linkage and a locking device which unlocks the multi-articulated linkage when the vehicle seat is pivoted or folded beyond a defined critical angle, by means of which multi-articulated linkage the vehicle seat is guidable, in particular pivotable and longitudinally displaceable, in a controlled manner between an unlocked first position, in particular a raised position of non-use or position of use, and an unlocked second position, in particular a rest position or a flat and consequently lower floor position in a stowed position, or vice versa.

Such a guided fixing device makes it possible to change the vehicle seat into a stowed position in a simple manner.

Over and above this, to stow the vehicle seat into a footwell of the vehicle, the fixing device can be locked and unlocked by a user in a simple and convenient manner by means of the locking device, a user of the vehicle not having to carry out a separate, time-consuming manual actuation of one or several locking elements which are situated apart from each other. The vertical and horizontal movement necessary for stowing the vehicle seat, in particular the combined pivoting movement and longitudinal displacement of the vehicle seat, is guided in a controlled manner by means of the fixing device and the locking device, a pivoting movement of the vehicle seat and of the multi-articulated linkage resulting in a displacement of the vehicle seat forward. Consequently, stowing the vehicle seat in the footwell is simplified for the user and brings about an increase in comfort and an enlargement of the loading surface or a stowage space. Human errors when the locking elements are opened and closed are also avoided.

One possible embodiment of the invention provides that the locking device has at least one pin-slot guide for the guided unlocking or locking of the multi-articulated linkage and one blocking device for locking the vehicle seat. This enables simple and secure unlocking and locking of the vehicle seat. Over and above this, the unlocking and locking guiding means of the multi-articulated linkage which is realized, for example, as a link-journal or as a pin-slot, makes it possible for the unlocking or locking forces necessary for the unlocking or locking to be applied.

In a further embodiment, for locking or unlocking, the vehicle seat is guidable, in particular pivotable, in a controlled manner by means of the pin-slot guide between a locked first or second position and an unlocked first or second position or vice versa. Consequently, the vehicle seat can be guided in a controlled manner both in the case of the unlocking movement as well as the locking movement from or into one of the locked end positions, in particular from or into a locked end position in the stowed position and from or into a locked end position in the raised position of the vehicle seat.

In a simple embodiment, the locking device includes a locking element which is realized as a pin and a recess which is realized as a slot, wherein the pin is arranged on the seat side and the slot on the linkage side. As an alternative to this, the pin can be arranged on the linkage side and the slot can be arranged on the seat side. This provides a simple guiding means for the vehicle seat during locking and unlocking.

Over and above this, the locking device includes a blocking device which has at least one recess which is realized as a slot and at least one blocking element which is realized as a bolt, wherein the slot is arranged on the seat side and the bolt on the linkage side or bodywork side or vice versa. This enables simple and removable blocking or locking of the vehicle seat in one of the locked end positions, i.e. in the locked stowed position or the locked raised position.

For the simple guiding of the vehicle seat into the stowed end position or back into the raised position, the multi-articulated linkage is preferably realized as a four-bar linkage, the first fixing element of which being fixed on the floor or bodywork side and the fourth fixing element of which being fixed on the seat side to a seating part which is realized as an actuating element. In this case, the second and third fixing elements are coupled together, said second and third fixing elements being realized as rockers and being arranged pivotably mounted at one end on the first fixing element, which serves as a clearance or floor, and at the other end being arranged pivotably mounted on the fourth fixing element, which is realized as a coupler or driving member. In other words: a simple four bar linkage, in particular a coupler or parallelogram linkage is made possible by means of the four fixing elements with four pivotal points.

In one possible embodiment, the pin-slot guiding means for guiding the vehicle seat during the locking or unlocking of the locking arrangement is arranged in the middle of the fourth fixing element which is realized as a coupler or driving means. In the case of a movement going beyond unlocking, it is possible to guide the multi-articulated linkage in a simple and secure manner by means of the fourth fixing element, which is realized as a coupler or driving member, in particular a connecting rod.

Over and above this, when viewed in the longitudinal direction, the first fixing element has a rear angled end on which the blocking element is arranged, fixed or integrally formed, for example in a form-fitting and/or friction-locking manner. In this case, the blocking element can be realized as a bolt or peg. As an alternative to this, the blocking element and the first fixing element can be realized in one piece, for example as a molded part.

In addition, the invention provides a vehicle seat, in particular a motor vehicle seat, having an at least partially foldable seating part and a backrest part which is foldable on the seating part as well as a fixing device which is fixed on the seat side and the bodywork side. In this case, when viewed in the longitudinal direction, the fixing device can be arranged by means of the fourth fixing element at the front end of the vehicle seat on the seating part thereof and by means of the first fixing element on the bodywork side or floor side, the second and third fixing elements which are realized as rockers being arranged between said fixing elements.

In this case, the fixing device is realized in such a manner that the vehicle seat can be folded with respect to an axis of the vehicle, the fixing device including a locking device which is unlocked when the vehicle seat is folded beyond a defined critical angle, a horizontal and vertical movement of the vehicle seat being guided in a controllable manner by means of the fixing device and the unlocked locking device for stowing the vehicle seat.

Figure 2:
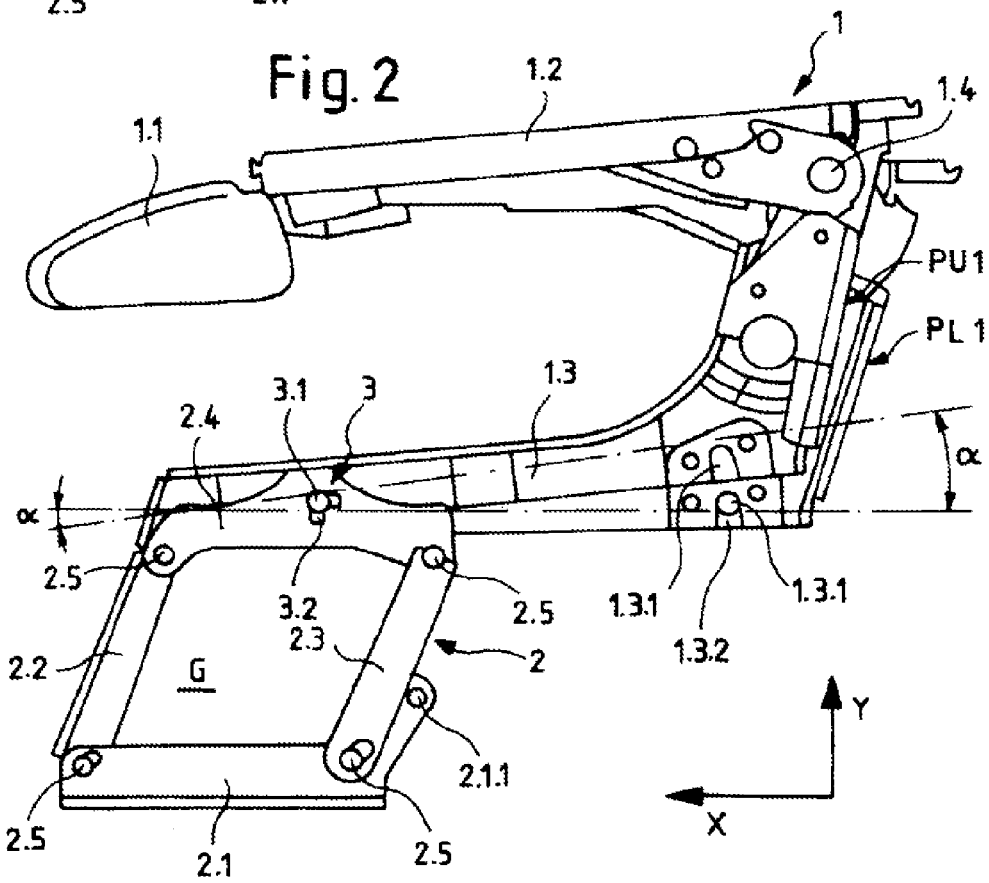

The invention is explained by way of the attached schematic figures, in which, in detail:

FIG. 1 shows a schematic representation of a side view of a vehicle seat in a locked first position, FIG. 2 shows a schematic representation of a side view of the vehicle seat according to FIG. 1 in the locked first position and in an unlocked first position, FIG. 3 shows a schematic representation of a side view of the vehicle seat according to figure 1 in an unlocked second position and in the locked first position and FIG. 4 shows a schematic representation of a side view of the vehicle seat according to FIG. 1 in a locked second position and in the locked first position.

Parts which correspond to each other are provided with identical references in all the figures.

FIG. 1 shows a side view of a vehicle seat 1. The vehicle seat 1 includes a headrest part 1.1, a backrest part 1.2 and a seating part 1.3.

The headrest part 1.1 is connected to the backrest part 1.2 so as to be displaceable in such a manner that a support height of the headrest part 1.1 is adjustable and readjustable.

The backrest part 1.2 is connected to the seating part 1.3 by means of an articulation 1.4 such that the backrest part 1.2 is pivotable between a collapsed position, in which the backrest part 1.2 and the seating part 1.3 are arranged substantially parallel to each other and parallel to a horizontal direction x, and an opened-out position in which the backrest part 1.2 is arranged substantially perpendicular to the seating part 1.3 and parallel to a vertical direction y.

The vehicle seat 1 is fixed in the vehicle by means of a fixing device 2. The fixing device 2 includes a first, a second, a third and a fourth fixing element 2.1, 2.2, 2.3. 2.4 which are pivotably connected by means of articulated connections 2.5 and are arranged with respect to each other in the form of a parallelogram. As an alternative to this, they can be arranged with respect to each other in a trapezoid manner.

The four fixing elements 2.1 to 2.4, in this case, form a multi-articulation linkage G, by means of which the vehicle seat 1 is movable or guidable, in particular pivotable and longitudinally displaceable, in a controlled manner at least between a locked first position PL1 shown in FIG. 1, in particular a raised position in a position of non-use or position of use, and a locked second position PL2 shown in FIG. 4, in particular a lower position in a rest position or in a stowed position close to the floor (flat bottom position).

In the exemplary embodiment shown, the multi-articulated linkage G is a four bar linkage. As an alternative to this, another multi-articulated linkage can also be used.

The first fixing element 2.1 extends parallel to the horizontal direction x and is fixedly connected to a part of the bodywork, in particular to a floor, of the vehicle and forms the clearance or the bottom linkage member of the multi-articulated linkage G.

The fourth fixing element 2.4 is fixed on the side of the seat to the seating part 1.3 which is realized as an actuating element. The fourth fixing element 2.4 serves as a coupler or a driving member of the multi-articulated linkage G.

The second and third fixing elements 2.2, 2.3 serve as rockers of the multi-articulated linkage G. The ends of said rockers are pivotably mounted at four pivotal points at one end on the fourth fixing element 2.4 which serves as a coupler or driving member and at the other end on the first fixing element 2.1 which serves as the floor.

When viewed in the longitudinal direction, at a rear angled end the first fixing element 2.1 has a blocking element 2.1.1, e.g. a bolt or peg which stands out in a perpendicular manner and serves for blocking the vehicle seat 1 when stowing the same in the stowed end position close to the floor, the locked second position PL2, in a footwell of the vehicle.

To this end, the seating part 1.3 which extends parallel to the first fixing element 2.1 has a corresponding blocking device 1.3.1. e.g. a vertical slot or a vertical recess which serves to accommodate the blocking element 2.1.1. The blocking device 1.3.1 and the blocking element 2.1.1 are consequently realized as a bolt/slot blocking means.

The first fixing element 2.1 is connected to the second fixing element 2.2 and the third fixing element 2.3 in each case by means of one of the articulated connections 2.5. In a corresponding manner, the fourth fixing element 2.4 is connected to the second fixing element 2.2 and the third fixing element 2.3 by means of respective articulated connections 2.5.

The seating part 1.3 is pivotably connected to the fourth fixing element 2.4 such that the vehicle seat 1 is pivotable or foldable about an axis, which extends normally to the plane spanned by the horizontal direction x and the vertical direction y, over at least one small critical angle a. The pivoting of the vehicle seat 1 over the critical angle a can be achieved in particular by means of raising the seating part 1.3.

The vehicle seat 1 is shown in FIG. 1 in the locked first position PL1 in which the spatial arrangement of the vehicle seat 1 and of the fixing device 2 is fixed by means of a locking device 3. In the locked first position PL1, the seating part 1.3 is aligned substantially parallel to the horizontal direction x.

The locking device 3 is arranged on the linkage side and the seat side and includes at least one pin-slot guiding means for the guided unlocking or locking of the multi-articulated linkage G during the unlocking or locking movement and the blocking device 1.3.1 for locking the vehicle seat 1 in the respective locked first and second position PL1 and PL2.

The locking device 3 includes a pin-shaped, peg-shaped or bolt-shaped locking element 3.1 as the pin-slot guiding means which is connected to the seating part 1.3 or is integrally formed on the seating part 1.3. The bolt-shaped locking element 3.1 is accommodated in a slot-shaped or slit-shaped recess 3.2, which is molded in the fourth fixing element 2.4, in such a manner that the vehicle seat 1 is fixed in the locked first position PL1 and can be guided in a controlled manner during unlocking or locking.

The blocking device 1.3.1 is realized as a perpendicular slit or a perpendicular recess, into which, in the locked first position PL1 a bolt 1.3.2, which is arranged on the bodywork side or floor side in a positive locking and/or frictional locking manner, or in the locked second position PL2 the blocking element 2.1.1 engage in a blocking manner such that the vehicle seat 1 is fixed and cannot be moved, in particular cannot be displaced.

FIG. 2 shows the vehicle seat 1 according to FIG. 1 in an unlocked first position PU1, in which the vehicle seat 1 is able to be moved along the horizontal direction x and in opposition to the vertical direction y.

To unlock the locking device 3 and the multi-articulated linkage G, the vehicle seat 1 has been folded or pivoted by the critical angle a. The seating part 1.3 is arranged slightly tilted in relation to the horizontal direction x.

For a better comparison of the spatial orientation of the vehicle seat 1 in the unlocked first position PU1, the vehicle seat 1 is shown in the locked first position PL1 according to FIG. 1 in the background of FIG. 2.

FIG. 3 shows the vehicle seat 1 in a stowed and unlocked second position PU2 and, for comparison therewith, the vehicle seat 1 in the locked first position PL1, which is shown in the background.

The second and the third fixing elements 2.2, 2.3 are aligned substantially parallel to the horizontal direction x. The vehicle seat 1 is movable from the unlocked first position PU1 into the unlocked second position PU2 in such a manner that at any time during the movement the second and third fixing elements 2.2, 2.3 and the first and the fourth fixing elements 2.1, 2.4 of the multi-articulated linkage G are aligned parallel to each other.

During the movement of the vehicle seat 1 from the unlocked first position PU1 into the unlocked second position PU2, the vehicle seat 1 is moved both into the horizontal direction x and antiparallel to the vertical direction y, the vehicle seat 1 being stowed in a footwell of the vehicle.

The movement of the vehicle seat 1 is guided in a controlled manner both by means of the articulated connections 2.5 of the first, second, third and fourth fixing elements 2.1, 2.2, 2.3, 2.4 which are pivotably mounted with respect to each other. In addition, said movement is guided in a controlled manner by the bolt-shaped locking element 3.1 which is guided in the recess 3.2 such that the vehicle seat 1 can be stowed in the footwell in a manner that is particularly simple and convenient for a user.

Proceeding from the unlocked second position PU2, with a correspondingly inverse movement the vehicle seat 1 can be folded out again and moved into the unlocked first position PU1.

FIG. 4 shows the vehicle seat 1 in a locked second position PL2 and, as a comparison therewith, in the background the vehicle seat 1 in the locked first position PL1.

The blocking element 2.1.1 is latched into the blocking device 1.3.1 such that the vehicle seat 1 is removably blocked in the locked second position PL2. This consequently avoids the vehicle seat 1 being inadvertently removed from the locked second position PL2. The latching of the blocking element 2.1.1 into the blocking device 1.3.1 can be effected by means of a force acting in opposition to the vertical direction y. Correspondingly, the vehicle seat 1 can be moved from the locked second position PL2 into the unlocked second position PU1 by means of briefly raising and tilting the seating part 1.3.

LIST OF REFERENCES

1 Vehicle seat
1.1 Headrest part
1.2 Backrest part
1.3 Seating part
1.3.1 Blocking device
1.3.2 Bolt
1.4 Articulation
2 Fixing device
2.1 First fixing element
2.1.1 Blocking element
2.2 Second fixing element
2.3 Third fixing element
2.4 Fourth fixing element
2.5 Articulated connection
3 Locking device
3.1 Locking element
3.2 Recess
G Multi-articulated linkage
PL1 Locked first position
PU1 Unlocked first position
PU2 Unlocked second position
PL2 Locked second position
x Horizontal direction
y Vertical direction
αCritical angle

The invention claimed is:

1. A fixing device for a vehicle seat with a backrest part and a seating part, the fixing device comprising:
   a multi-articulated linkage comprising a plurality of fixing elements, wherein the plurality of fixing elements include an upper fixing element that is configured to be pivotally connected to the seating part of the vehicle seat; and
   a locking device configured to unlock the multi-articulated linkage, wherein the locking device includes a pin-slot guide configured to pivotally connect the seating part to the upper fixing element such that the seating part of the vehicle seat can be pivoted beyond a defined critical angle,
   wherein the multi-articulated linkage is configured to guide the seating part of the vehicle seat in a controlled manner between an unlocked first position and an unlocked second position, or vice versa, when the seating part has been pivoted beyond the defined critical angle,
   wherein the plurality of fixing elements form a polygonal shape in the unlocked first position such that the upper fixing element is in a raised position, and the plurality of fixing elements are folded relative to each other in the unlocked second position such that the upper fixing element is in a lowered position.

2. The fixing device as claimed in claim 1, wherein the locking device further includes at least one bolt-slot mechanism for unlocking and locking the multi-articulated linkage.

3. The fixing device as claimed in claim 2, wherein the pin-slot guide controllably guides the vehicle seat between a locked first position and the unlocked first position and between a locked second position and the unlocked second position.

4. The fixing device as claimed in claim 1, wherein the pin-slot guide includes a pin and a slot, wherein the pin is arranged on the vehicle seat and the slot is arranged on the upper fixing element.

5. The fixing device as claimed in claim 1, wherein the locking device includes a bolt-slot mechanism which includes a blocking slot and a bolt, wherein the blocking slot is arranged on the vehicle seat and the bolt is arranged on the multi-articulated linkage or vice versa.

6. The fixing device as claimed in claim 1, wherein the multi-articulated linkage is a four-bar linkage with a first fixing element, a second fixing element, a third fixing element, and the upper fixing element, wherein the first fixing element is configured to be fixed on a floor or bodywork side of a vehicle, wherein the first fixing element and the upper fixing element are coupled together and are pivotably mounted to ends of the second fixing element and the third fixing element, wherein the second fixing element and the third fixing element are rockers to move the upper fixing element relative to the first fixing element.

7. The fixing device as claimed in claim 6, wherein the pin-slot guide is arranged in a middle portion of the upper fixing element.

8. The fixing device as claimed in claim 6, wherein, when viewed in the longitudinal direction, the first fixing element has a rear angled end extending upwards on which a blocking element is arranged or integrally formed.

9. A motor vehicle seat, comprising the seating part which is at least partially foldable; the backrest part which is foldable on the seating part; and the fixing device which is attached to the seating part as claimed in claim 1.

10. The vehicle seat as claimed in claim 9, wherein, when viewed in the longitudinal direction, the fixing device is arranged at a front end of the seating part through the upper fixing element of the multi-articulated linkage.

11. The vehicle seat as claimed in claim 1, wherein the vehicle seat is pivotable and longitudinally displaceable between the unlocked first position and the unlocked second position.

12. The vehicle seat as claimed in claim 1, wherein the unlocked first position is one of a position of non-use and a raised position of non-use.

13. The vehicle seat as claimed in claim 1, wherein the unlocked second position is a rest position or lowered position.

* * * * *